(12) United States Patent
Tanakamaru et al.

(10) Patent No.: US 11,132,244 B2
(45) Date of Patent: Sep. 28, 2021

(54) BLOCK HEALTH CHECKING

(71) Applicant: Seagate Technology LLC, Cupertino, CA (US)

(72) Inventors: Shuhei Tanakamaru, San Jose, CA (US); Scott McClure, Sudbury (CA); Erich Franz Haratsch, San Jose, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/683,742

(22) Filed: Nov. 14, 2019

(65) Prior Publication Data
US 2021/0149753 A1 May 20, 2021

(51) Int. Cl.
| | |
|---|---|
| *G06F 11/00* | (2006.01) |
| *G06F 11/07* | (2006.01) |
| *G06F 11/10* | (2006.01) |
| *G06F 13/16* | (2006.01) |
| *G06F 12/0882* | (2016.01) |
| *G06F 12/02* | (2006.01) |
| *G06F 11/30* | (2006.01) |

(52) U.S. Cl.
CPC .......... *G06F 11/076* (2013.01); *G06F 11/073* (2013.01); *G06F 11/1004* (2013.01); *G06F 11/1016* (2013.01); *G06F 11/3037* (2013.01); *G06F 12/0246* (2013.01); *G06F 12/0284* (2013.01); *G06F 12/0882* (2013.01); *G06F 13/1668* (2013.01)

(58) Field of Classification Search
CPC .. G06F 11/076; G06F 11/073; G06F 11/1004; G06F 11/1016; G06F 11/3037; G06F 13/1668; G06F 12/0882; G06F 12/0284; G06F 12/0246
See application file for complete search history.

(56) References Cited

U.S. PATENT DOCUMENTS

| | | | |
|---|---|---|---|
| 8,255,772 B1 | 8/2012 | Foley | |
| 8,719,531 B2 | 5/2014 | Strange et al. | |
| 8,762,798 B2 | 6/2014 | Hu et al. | |
| 8,996,961 B2 | 3/2015 | Chen et al. | |
| 9,201,728 B2 | 12/2015 | Patapoutian et al. | |
| 9,419,655 B2 | 8/2016 | Cai et al. | |
| 9,425,829 B2 | 8/2016 | Ramaraju et al. | |
| 9,495,232 B2 * | 11/2016 | Gjorup ................ | G06F 11/1048 |
| 9,698,935 B2 | 7/2017 | Linstadt | |

(Continued)

OTHER PUBLICATIONS

Non-Final Rejection for U.S. Appl. No. 16/667,491, dated Dec. 22, 2020, 13 pages.

(Continued)

*Primary Examiner* — Samir W Rizk
(74) *Attorney, Agent, or Firm* — Westman, Champlin & Koehler, P.A.

(57) ABSTRACT

A method includes determining a portion of a block of a storage device to read after programming, and reading the portion of the block and determining a maximum error count for the portion of the block. The maximum error count is compared to a threshold. When the maximum error count exceeds the threshold, a code rate of an error correction coding used to program the block is adjusted, or a code rate test is performed on the entire block.

15 Claims, 6 Drawing Sheets

(56) References Cited

U.S. PATENT DOCUMENTS

| | | |
|---|---|---|
| 9,727,416 B2 | 8/2017 | Dick |
| 9,917,674 B2 | 3/2018 | Soong et al. |
| 10,101,931 B1 * | 10/2018 | Camp ................. G06F 12/0866 |
| 2010/0088557 A1 * | 4/2010 | Weingarten ......... G06F 11/1068 714/704 |
| 2012/0324191 A1 * | 12/2012 | Strange ................ G06F 11/008 711/165 |
| 2013/0061115 A1 | 3/2013 | Imai et al. |
| 2013/0246878 A1 | 9/2013 | Pancholi et al. |
| 2013/0275818 A1 | 10/2013 | Okubo et al. |
| 2018/0067666 A1 | 3/2018 | d'Abreu |
| 2018/0342305 A1 * | 11/2018 | Cha ........................ G11C 16/26 |
| 2019/0107959 A1 | 4/2019 | Papandreou et al. |
| 2019/0286516 A1 | 9/2019 | Jacobvitz et al. |

OTHER PUBLICATIONS

Applicant-Initiated Interview Summary for U.S. Appl. No. 16/667,491, dated Mar. 15, 2021, 2 pages.
Final Rejection for U.S. Appl. No. 16/667,491, dated Apr. 28, 2021, 7 pages.
Non-Final Rejection for U.S. Appl. No. 16/683,742, dated Jan. 14, 2021, 13 pages.
Applicant-Initiated Interview Summary for U.S. Appl. No. 16/683,742, dated Mar. 8, 2021, 2 pages.
Applicant-Initiated Interview Summary for U.S. Appl. No. 16/667,491, dated Jun. 30, 2021, 2 pages.

* cited by examiner

BLOCK HEALTH CHECKING

SUMMARY

In one embodiment, a method includes determining a portion of a block of a storage device to read after programming, and reading the portion of the block and determining a maximum error count for the portion of the block. The maximum error count is compared to a threshold. When the maximum error count exceeds the threshold, a code rate of an error correction coding used to program the block is adjusted, or a code rate test is performed on the entire block.

In another embodiment, an apparatus includes an interface configured to process a plurality of read/write operations to/from a memory, and a control circuit. The control circuit is configured to determine a portion of a block in the memory to read after each program/erase cycle of the block, to count a maximum error count within the portion of the block, and to compare the maximum error count to a threshold. When the maximum error count exceeds the threshold, the controller is configured to perform an additional code rate action.

In another embodiment, a method for partial read scrub code rate testing in a storage device includes reading a portion of a block in a memory of the storage device, and determining a maximum error count within the portion of the block. The maximum error count is compared to a threshold. When the maximum error count exceeds the threshold, an additional code rate action is performed.

This summary is not intended to describe each disclosed embodiment or every implementation of block health checking in a data storage device as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1:
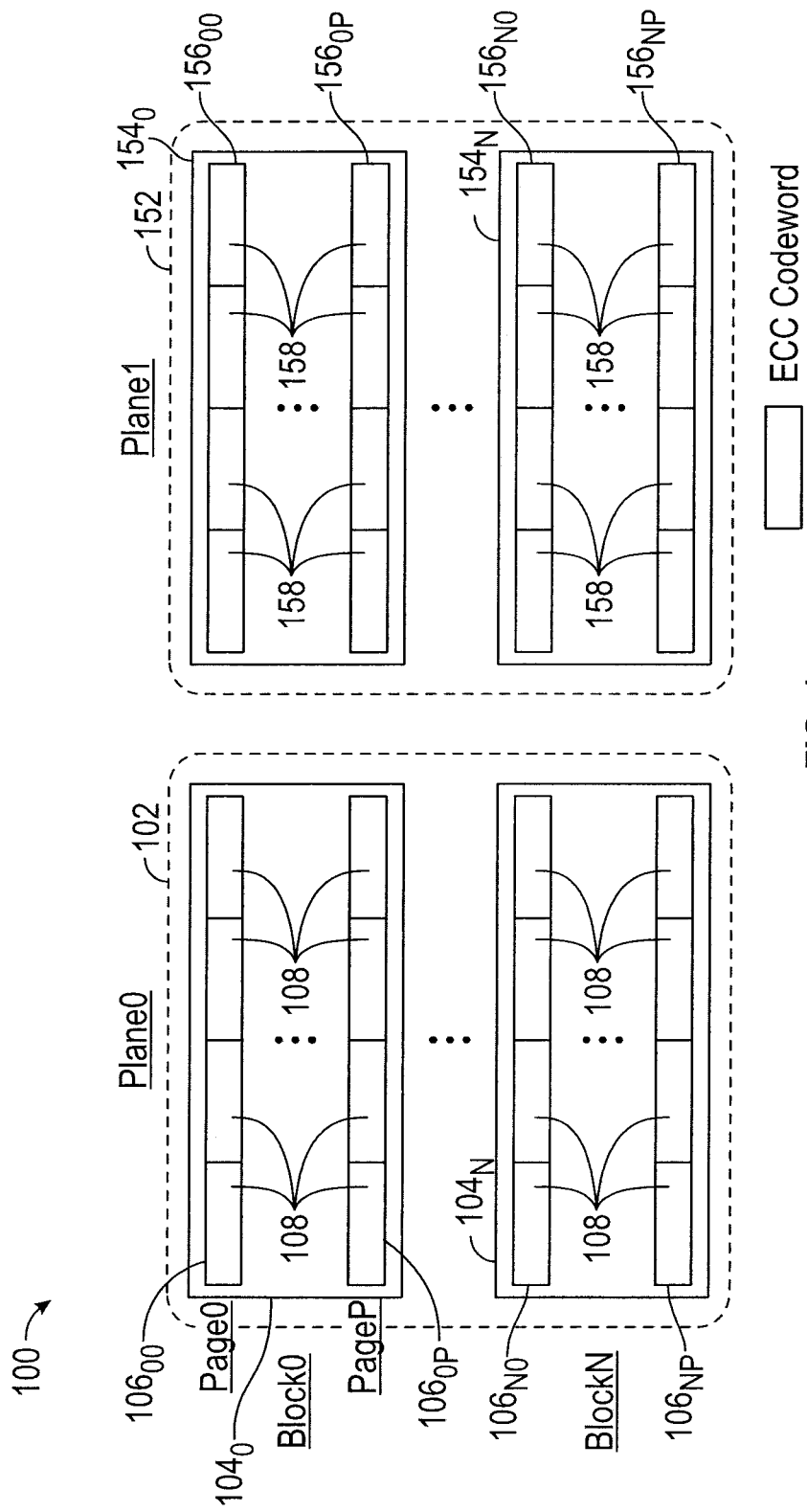
FIG. 1 is a block diagram of a storage device physical architecture on which embodiments of the present disclosure may be used.

Embodiments of the present disclosure provide methods to quickly check the block health and adapt the code rate for a data storage device, e.g., a solid state drive (SSD), or a hybrid drive including moving storage elements and solid state memory. This is accomplished in one embodiment by performing a test that reads a portion of a block after each program/erase count (PEC) and carries out a mini read scrub code rate (RSCR) test.

In order to improve performance but also to perform RSCR test more frequently, in one embodiment, the present disclosure performs a mini RSCR test after each program/erase cycle (PEC), in which, in one embodiment, the mini RSCR test is performed on a portion of a block, for example, a single page or a few pages or codewords on a page. This is integrated in one embodiment in background operations of an SSD. Upon completion of the mini RSCR test for the portion of the block, a determination is made as to a maximum fail-bit count of a codeword within a block. If this maximum error exceeds a threshold, the embodiments of the disclosure may adjust the code rate immediately, or invoke a full RSCR process for a higher quality test. Because of the much smaller amount of data read, and the reading of the data after each PEC, a faster and improved RSCR test is provided. While a mini RSCR test after every PEC is discussed herein, it should be understood that a mini RSCR test may be performed on a schedule of less than every PEC, such as every two PECs, every 100 PECs, or on a schedule determined by a user, without departing from the scope of the disclosure.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

NAND flash blocks may have fail bit counts that change abruptly. This can lead to a catastrophic performance degradation and/or data loss. Because of this, it is desirable to check block health after every program/erase count. However, in a traditional RSCR test, all pages in a block are read at each test initiation, leading to a slowdown in performance. Further, traditional RSCR tests are triggered on a one-time basis at the end of a programming operation, for example, based on a number of elapsed PECs since an RSCR test, a predetermined percentage of the device expected life that has elapsed, or a time elapsed since a previous RSCR test. Therefore, a RSCR test will not occur after every PEC, but when triggered by predefined criteria. Since traditional RSCR tests are not performed on every PEC, they are therefore not a good determinant of ongoing device health. A full RSCR test can be time and resource intensive, as it reads all pages within a block to do the RSCR test for the block. Therefore, embodiments of the present disclosure perform a condensed version of a RSCR test at each PEC.

Referring to FIG. 1, a representative NAND flash physical architecture 100 is shown. Architecture 100 includes a pair of planes 102 and 152, each having a number of blocks $104_0$, $104_1$, ..., $104_N$ and $154_0$, $154_1$, ..., $154_N$, respectively.

Each block 104, 154, includes a number of pages $106_{00}$, $106_{01}, \ldots, 106_{0P}$ to $106_{N0}, 106_{N1}, \ldots, 106_{NP}$ and $156_{00}$, $156_{01}, \ldots, 156_{0P}$ to $156_{N0}, 156_{N1}, \ldots, 156_{NP}$, respectively. Each page includes a number of ECC codewords per page. While four ECC codewords 108, 158 are shown for each page 104, 154, the number of codewords per page may be greater or fewer without departing from the scope of the disclosure. For an example architecture 100, each page may contain 16 codewords, and each block may contain 1152 pages, for a total of 18,432 codewords per block. With a full RSCR test, reading of over 18,000 codewords can strongly impact performance.

Embodiments of the present disclosure provide a mini RSCR test that reduces the number of codewords read but increases the frequency with which some RSCR testing is performed. The embodiments of the present disclosure therefore provide a way to more quickly determine health of a block, and to check block health more frequently. This results in both high reliability and maintenance of high performance for several reasons.

1) Embodiments of the present disclosure provide more frequent triggering of a test with less impact on performance.

2) Embodiments of the present disclosure have smaller amount of data to read.

3) Embodiments of the present disclosure allow for initiation of the mini RSCR test by hardware such as a controller or dedicated hardware to initiate the mini RSCR test, firmware, or by a host read that may be used to collect statistics.

4) Embodiments of the present disclosure use a maximum error count to decide further action.

5) Depending on the maximum error count, a code rate adjustment may be made, or a full RSCR test may be invoked for better quality testing.

When a code rate test is performed, whether it is a full RSCR or a mini RSCR as described herein, the code rate test scheme collects statistics such as but not limited to retry counts, total clock cycles of a low density parity check (LDPC) decoder, etc. In embodiments of the present disclosure, this is done immediately after programming the block, and is used to decide whether to adjust the code rate, to invoke a full RSCR test, or to continue without adjustment. In embodiments of the disclosure, during the collection of the statistics, fail-bit count statistics are also collected. This collection of statistics including fail bit count statistics, allows for operation of embodiments of the present disclosure.

Embodiments of the present disclosure therefore provide a mini RSCR test in contrast to a conventional RSCR test. Immediately after programming, a small number of pages of a block are read and the stats are collected. A maximum error is determined, in one embodiment based on fail-bit counts. If the maximum error is above a threshold, or there are more than a retry threshold number of retries (e.g., zero), the code rate is adjusted or a full code rate test is performed.

The mini RSCR test operation may be performed either during foreground program operation, or during background operation which periodically reads the blocks. Host-reads can also be utilized to collect additional statistics.

In order to perform a RSCR test of any type, two conditions are determined. First, the block to be checked is read within a predetermined time period after programming, and in one embodiment substantially immediately after programming, to reduce transient noise such as retention, read disturb, cross temperature, and the like. Second, the block statistics are collected to allow determination of the block health and potential code rate adjustment.

To satisfy the conditions for a RSCR test, embodiments of the present disclosure performing a mini RSCR test do the following. First, a portion of the block is read shortly after programming. The portion may be determined by a user, or may be based on other criteria. In one embodiment, a single page of the block is read. In other embodiments, the portion of the block may be different without departing from the scope of the disclosure. Second, the mini RSCR test collects the statistics from the portion of the block that is read.

The mini RSCR test embodiments may be integrated into SSD background operations that read the blocks of the SSD periodically. The mini RSCR test embodiments may also utilize a read initiated by a host to collect statistics so that a better sample may be obtained with no extra reads.

While operation of the mini RSCR tests of the present disclosure may be done using background operation and host-initiated read operation, which will be described in greater detail below, most of the time, operation of the mini RSCR test of the present disclosure will be performed as a standalone, or foreground, operation.

Figure 2:
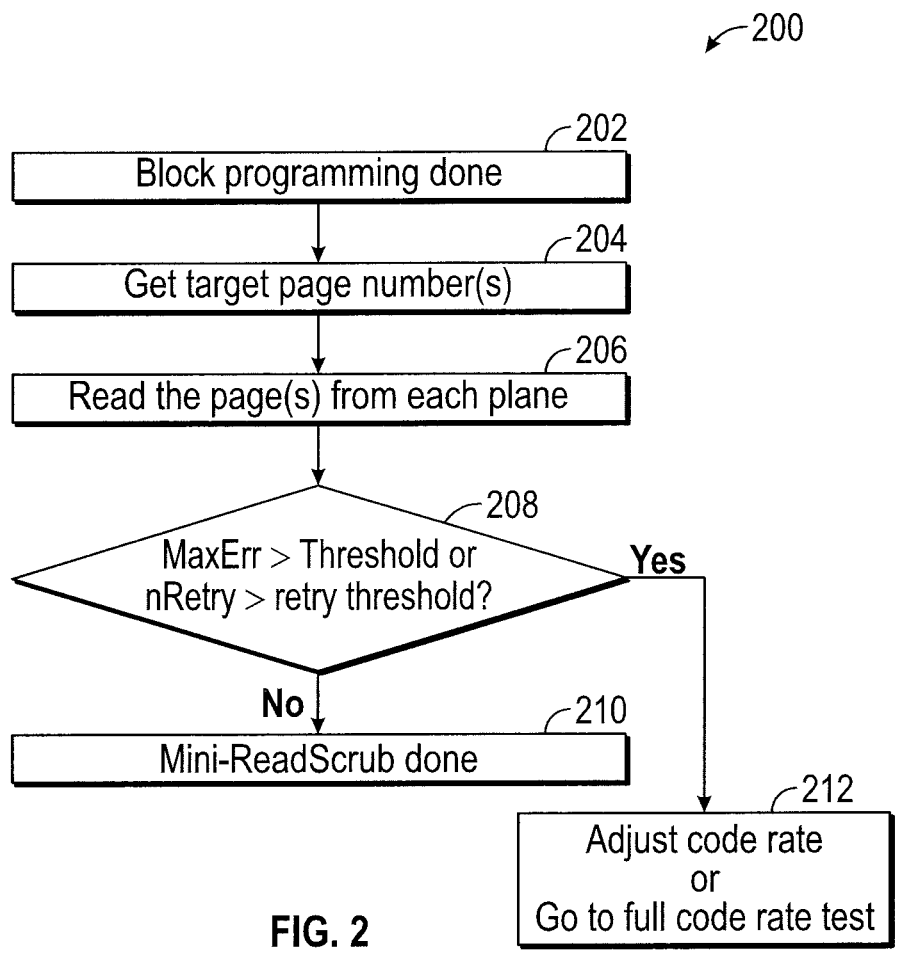
FIG. 2 is a flow diagram of a method according to an embodiment of the present disclosure.

A method 200 of foreground mini RSCR test operation is shown in flow chart form in FIG. 2. Method 200 includes completing block programming in block 202, and determining target page number(s) for the mini RSCR test in block 204. Once the pages to be read for the mini RSCR test are determined, the determined page(s) are read from each plane of the system in block 206. Maximum error is determined for the page(s) read (see below for detail on determining maximum error). In decision block 208, if the determined maximum error is greater than a predetermined error threshold, or if the number of retries (e.g., the number of attempts to read the page after the first attempt) is greater than the retry threshold, process flow continues to block 212. In block 212, the code rate is adjusted, or a full code rate test is initiated. If the number of retries is less than the retry threshold, and the determined maximum error is less than the error threshold, the mini RSCR test is finished at block 210.

A variety of methods may be used to select a target page number or numbers. One option is to read a page with a known high fail-bit count, for example based on history or observation, or a previous known characterization of a memory. Another option is to start at a first page, or at a random page, and increment the page after every mini RSCR test to eventually read all pages. Yet another option is to alternate page types based on their positions in the block. It should be understood that any number of different ways to choose what pages are subjected to a mini RSCR test may be used. A table may be stored that tracks the pages that have already had a mini RSCR test, and to choose pages that have not been previously subjected to a mini RSCR test until all or substantially all pages have been used for a mini RSCR test.

Maximum error count in one embodiment determines a fail-bit count according to a maximum fail-bit count of an error correction code (ECC) codeword within a block. The fail-bit count statistics are compared against a threshold value, to determine whether further action is to be taken. To obtain a maximum error metric count, a maximum of all the bit error counts of all the ECC codewords within a block is reported, or may be estimated from syndrome weight. Syndrome weight may be used when the ECC fails, to estimate a number of bit errors. Syndrome weight may be used by counting each ECC equation used as a pass or a fail. ECC equations are the evaluated determinations that are used to decide if errors are present. The results of the ECC equations used in the ECC code are a syndrome. Totaling the number of non-zero symbols in the sydrome equates to syndrome weight, allowing an estimation of bit error count even with a failure. Use of syndrome weight as a method to obtain fail bit counts allows further flexibility in code rate adaptation.

SSDs contain internal memory, for example, in the controller, in a dedicated memory, or within the NAND flash. The internal SSD memory holds data to be programmed. In another embodiment, this data is retained after programming, such as by reading the data back from the flash, data comparison can be performed between the actual written data and the data that was in the internal memory prior to it being written. Therefore, in another embodiment, bit error counts are obtained by reading the raw data (without ECC decoding) from the NAND flash and comparing the raw data with the remaining data in the write buffer of the SSD. This does not rely on ECC decoding, but provides a bit error determination.

While maximum error has been described and shown as the metric to compare against the threshold, it should be understood that additional or different fail bit count metrics may be used without departing from the scope of the disclosure. For example, average maximum error for multiple pages or multiple blocks, or for all pages or blocks written, could be used.

If there is a background operation on an SSD embodiment that scans through blocks in a drive, that operation can be used in conjunction with extra instructions used to add a mini RSCR test to existing operation. In one embodiment, when an operation is scanning blocks and gets to a block that has not had a mini RSCR test performed yet, a mini RSCR test may be performed. Background integration of the mini RSCR test with existing SSD background operations results in fewer performance penalties.

Figure 3:
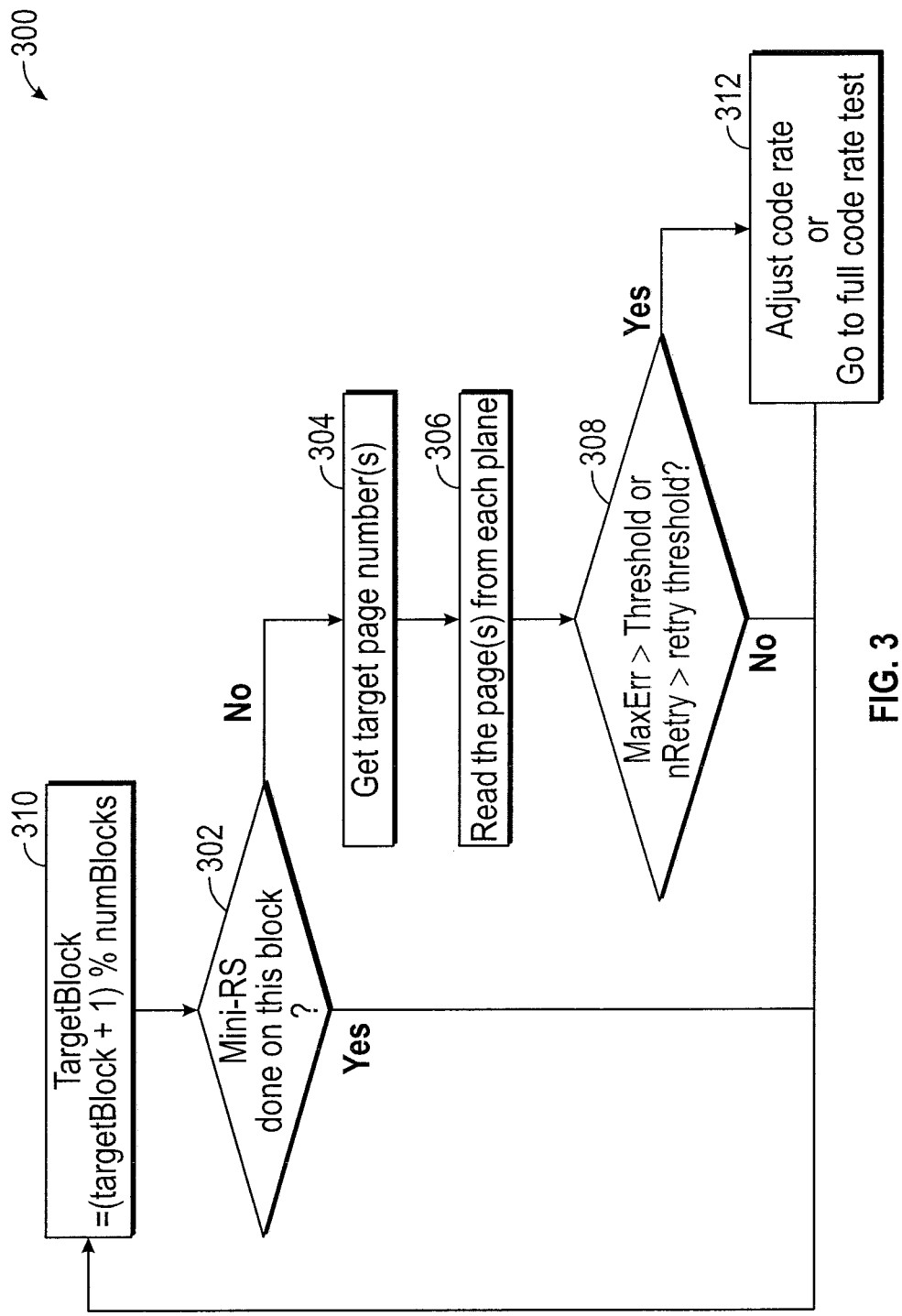
FIG. 3 is a flow diagram of a method according to another embodiment of the present disclosure.

A method 300 of background mini RSCR test operation is shown in flow chart form in FIG. 3. In one embodiment, background mini RSCR operation is integrated with operations of an SSD that are already performing block read operations. Method 300 comprises determining in decision block 302 whether a mini RSCR test has been performed on the block that is to be read. If a mini RSCR test has been performed on the block, process flow continues with incrementing the block in block 310. Incrementing may be performed in a number of ways, such as but not limited to moving to a next block, or moving a certain percentage of the number of blocks, or the like. If a mini RSCR test has not been performed on the block being read or scanned, then a target page number or numbers is obtained in block 304. Once the pages to be read for the mini RSCR test are determined, the determined page(s) are read from each plane of the SSD in block 306. Maximum error is determined for the page(s) read (as described above). In decision block 308, if the determined maximum error is greater than a predetermined error threshold, or if the number of retries is greater than a retry threshold number of retries (e.g., zero), process flow continues to block 312. In block 312, the code rate is adjusted, or a full code rate test is initiated. If the number of retries is less than the retry threshold, and the determined maximum error is less than the error threshold, process flow continues at block 310.

A decision in determination block 302 as to whether a mini RSCR test has been performed on the current block may also make additional determinations. For example, statistics collection may be counter-indicated once a certain amount of time since a program operation has elapsed. Once the time is outside of a predetermined time since programming, a mini RSCR will not collect proper statistics, and will therefore not be useful. Additionally, a determination may be made in decision block 302 as to a number of pages of the block that have undergone a mini RSCR test already, and if that number, or a certain percentage of the pages of the block, have already been tested, a mini RSCR test may be skipped in favor of a different block.

If there is a host-initiated read operation on an SSD, an operation to add the collection of statistics as a sample for a mini RSCR test may also be made to provide additional data points for determination of whether a code rate should be adjusted. At any time there is a host-initiated read, provided the block being read has been programmed within the predetermined time discussed above, a collection of statistics may be made collect statistics that can be used to have more data that allows a better decision to be made. If a host read is initiated outside the time window for collection of proper statistics, the statistic will either not be collected, or will not be used in determination of a code rate adjustment.

Figure 4:
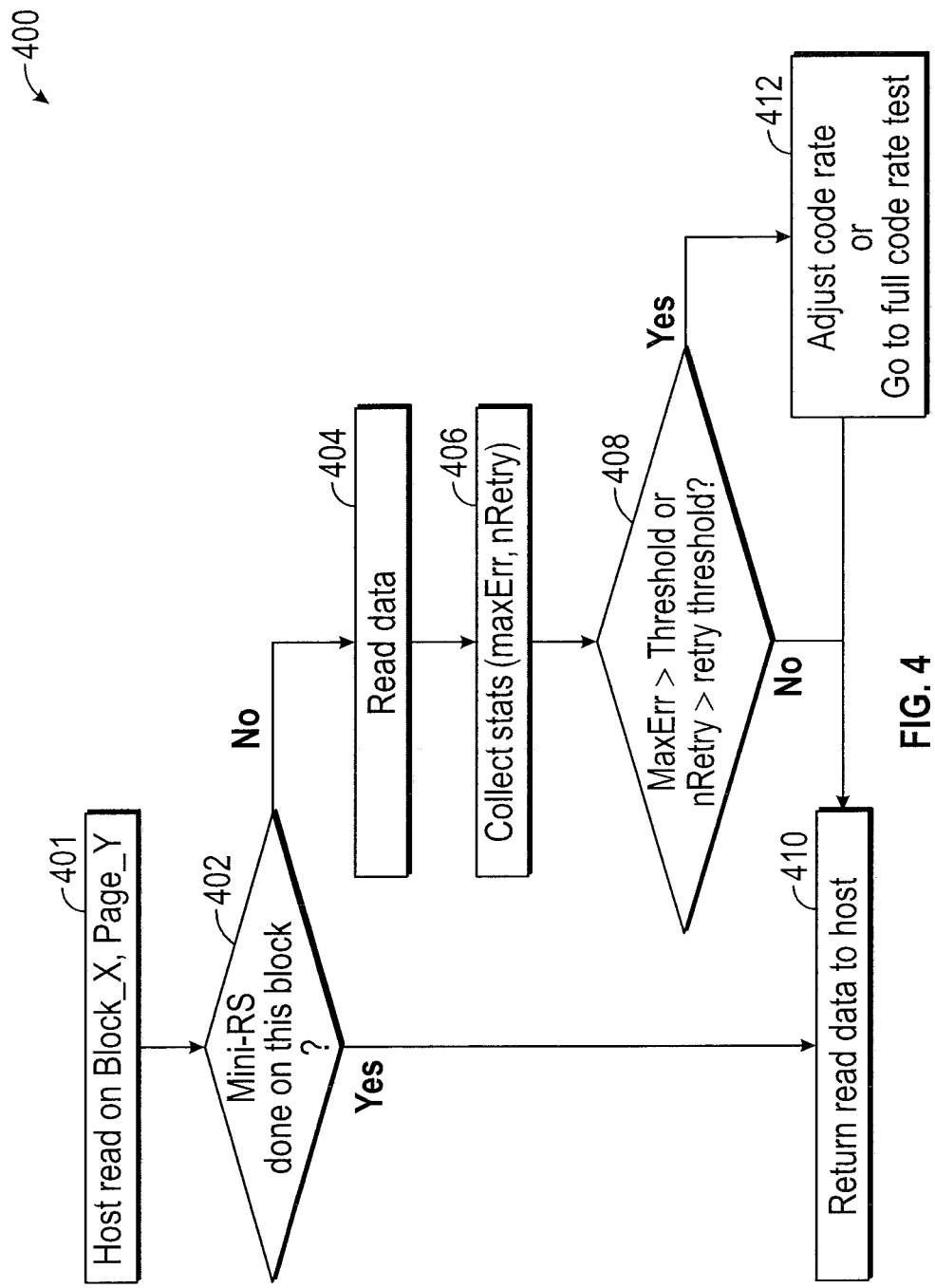
FIG. 4 is a flow diagram of a method according to another embodiment of the present disclosure.

A method 400 of a host-initiated mini RSCR test operation is shown in flow chart form in FIG. 4. In one embodiment, host-initiated mini RSCR operation is integrated with a host-initiated read on a block. Method 400 comprises initiation of a host read in block 401, and determining in decision block 402 whether a mini RSCR test has been performed on the block that is being read. If a mini RSCR test has been performed on the block, process flow continues with returning read data to the host in block 410. If a mini RSCR test has not been performed on the block being read, then the data is read in block 404, and statistics are collected in block 606. Maximum error is determined for the page(s) read (as described above). In decision block 408, if the determined maximum error is greater than a predetermined error threshold, or if the number of retries is greater than a retry threshold number of retries (e.g., zero), process flow continues to block 412. In block 412, the code rate is adjusted, or a full code rate test is initiated. If the number of retries is less than the retry threshold, and the determined maximum error is less than the error threshold, or after a code rate adjustment or full RSCR test, process flow continues at block 410.

It should be understood that process flow may be ordered differently in the host- or firmware-initiated mini RSCR test. For example, in a host-initiated mini RSCR test, the data may be returned to the host prior to analysis of the statistics. Further, both firmware-initiated and host-initiated mini RSCR may coexist.

Figure 5:
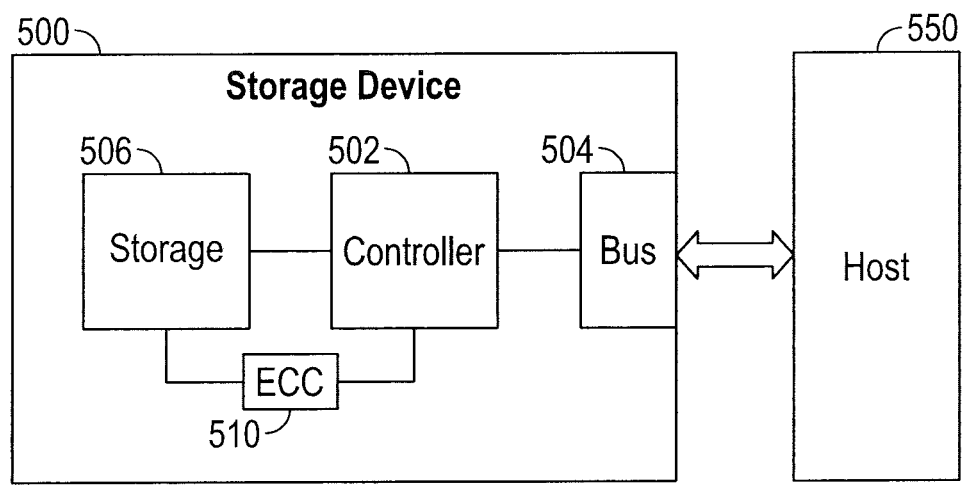
FIG. 5 is a block diagram of a data storage device on which embodiments of the present disclosure may be used.

Referring now to FIG. 5, a simplified block diagram of a storage system 500 on which embodiments of the present disclosure may be practiced is shown. Storage system 500 may be a solid state drive including non-volatile memory and associated controllers such as are known in the art; or any other storage system for persistent storage of information. System 500 may include, by way of example, a controller 502 coupleable via a bus 504 or the like to a host system 550, where the host system 550 may provide power over the bus 504 or through a separate power bus (not shown), and a storage component 506 (such as nonvolatile memory). Mini RSCR testing in the system 500 may be performed according to the methods described herein.

Figure 6:
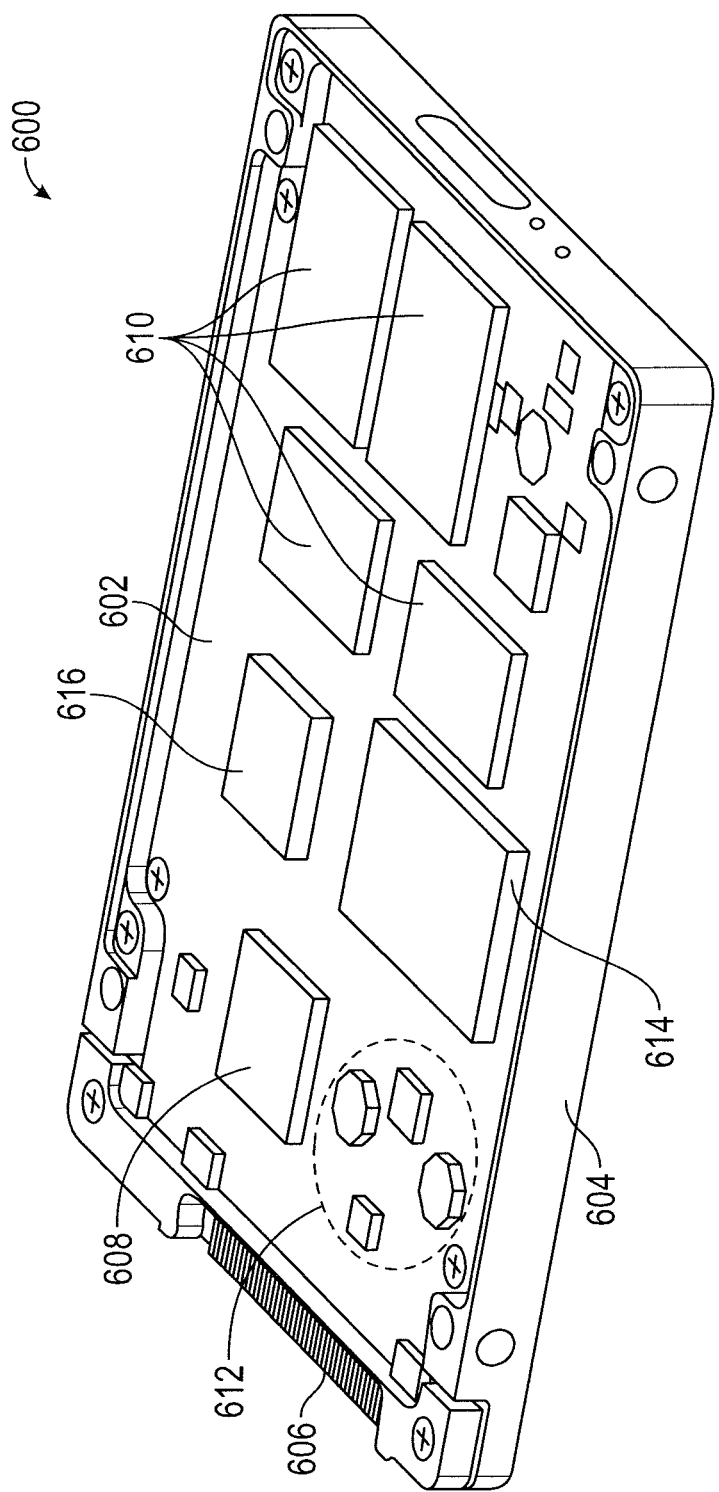
FIG. 6 is an oblique view of a solid state drive (SSD) on which embodiments of the present disclosure may be used.

FIG. 6 illustrates an oblique view of a solid state drive (SSD) 600 in accordance with a system embodying the methods described herein may be used. SSD 600 includes one or more printed circuit boards (PCBs) or circuit card assemblies 602 and typically includes a protective, supportive housing 604, and one or more interface connectors 606.

SSD 600 further includes a controller application specific integrated circuit (ASIC) 608 or field programmable gate array (FPGA), one or more non-volatile memory devices 610, and power regulation circuitry 612. The memory devices 610 are essentially the SSD's data storage media. SSD 600 may include erasure blocks as the physical storage locations within memory device 610, which may include Flash memory devices, for example. In some applications, SSD 600 further includes a power-backup energy storage device, such as a super-capacitor 614.

In accordance with certain aspects, the SSD 600 includes the circuit card assembly 602 that includes a connector 606 for connection to a host computer (not shown). In accordance with certain aspects, the connector 606 includes a NVMe (non-volatile memory express), SCSI (small computer system interface), SAS (serial attached SCSI), FC-AL (fiber channel arbitrated loop), PCI-E (peripheral component interconnect express), IDE (integrated drive electronics), AT (advanced technology), ATA (advanced technology attachment), SATA (serial advanced technology attachment), IEEE (institute of electrical and electronics engineers)-1394, USB (universal serial bus) or other interface connector adapted for connection to a host computer. Mini RSCR tests in the system 600 may be performed and code rate adaptation or full RSCR testing provided according to the methods described herein, with instructions stored on the controller 608, or in a separate memory controller for memory devices 610.

A mini RSCR test apparatus according to an embodiment of the present disclosure includes an interface configured to process a plurality of read/write operations to/from a memory, and a control circuit. The control circuit is configured to read a portion of a block in the memory after every program/erase cycle of the block, count a number of failed bit counts within the portion of the block, and, when the maximum error count exceeds the threshold, adjusting a code rate of an error correction coding used to program the block or performing a code rate test on the entire block. The control circuit and/or error correction coding may be stored in the controller 608 or on a dedicated ECC circuit 510, 616 configured to encode and decode data using any of a plurality of error correction codes (ECCs) of different code rates, and to determine a fail bit count of an ECC codeword within a portion or a full block of a storage device 506, 610 of the apparatus.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
   determining a portion of a block of a storage device to read after programming the block;
   reading the portion of the block and determining a maximum error count for the portion of the block, wherein reading the portion of the block is performed within a predetermined time after programming the block;
   comparing the maximum error count to a threshold; and
   when the maximum error count exceeds the threshold, adjusting a code rate of an error correction coding used to program the block or performing a code rate test on the entire block.

2. The method of claim 1, wherein reading the portion of the block is performed immediately after programming.

3. The method of claim 1, wherein determining a portion of a block to read comprises selecting a page of the block at random.

4. The method of claim 1, wherein determining a portion of a block to read comprises selecting a page that has a known high fail-bit count.

5. The method of claim 1, wherein determining a portion of a block to read comprises selecting a page an increment away from a page that has already been tested.

6. The method of claim 1, wherein determining a portion of a block to read comprises selecting a page in a different physical location within the block as a page that has already been tested.

7. The method of claim 1, wherein the method is performed as a part of a background storage device scanning operation.

8. The method of claim 1, wherein the method is performed as a part of a host-initiated read operation.

9. An apparatus, comprising:
   an interface configured to process a plurality of read/write operations to/from a memory; and
   a controller configured to:
      determine a portion of a block in the memory to read after each program/erase cycle of the block;
      read the determined portion of the block and determine a maximum error count within the portion of the block, wherein reading the portion of the block is performed within a predetermined time after programming the block;
      compare the maximum error count to a threshold; and
      when the maximum error count exceeds the threshold, performing an additional code rate action by adjusting a code rate of an error correction coding used to program the block or performing a code rate test on the entire block.

10. A method for partial read scrub code rate testing in a storage device, comprising:
    determining a portion of a block to read comprising selecting a page in a different physical location within the block as a page that has already been tested;
    reading the portion of the block in a memory of the storage device within a predetermined time after programming the block;
    determining a maximum error count within the portion of the block;
    comparing the maximum error count to a threshold; and
    when the maximum error count exceeds the threshold, performing an additional code rate action.

11. The method of claim 10, wherein performing the additional code rate action comprises adjusting a code rate of an error correction coding used to program the block.

12. The method of claim 10, wherein performing the additional code rate action comprises performing a code rate test on the entire block.

13. The method of claim 10, wherein reading the portion of the block is performed within a predetermined time after programming.

14. The method of claim 10, wherein determining the portion of the block to read comprises selecting a page that has a known high fail-bit count.

15. The method of claim 10, wherein determining the portion of the block to read comprises selecting a page an increment away from a page that has already been tested.

* * * * *